(12) United States Patent
Isaka et al.

(10) Patent No.: US 7,384,553 B2
(45) Date of Patent: Jun. 10, 2008

(54) METHOD FOR OPERATING ANAEROBIC AMMONIUM OXIDATION VESSEL AND ANAEROBIC AMMONIUM OXIDATION EQUIPMENT

(75) Inventors: Kazuichi Isaka, Chiyoda-ku (JP); Tatsuo Sumino, Chiyoda-ku (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 274 days.

(21) Appl. No.: 11/153,682

(22) Filed: Jun. 16, 2005

(65) Prior Publication Data

US 2005/0279702 A1 Dec. 22, 2005

(30) Foreign Application Priority Data

Jun. 18, 2004 (JP) ............................. 2004-181540

(51) Int. Cl.
*C02F 3/28* (2006.01)
*C02F 3/34* (2006.01)

(52) U.S. Cl. ............... 210/601; 210/615; 210/259; 210/903; 435/252.1

(58) Field of Classification Search ............... 210/601, 210/615–618, 252, 259, 903; 435/252.1
See application file for complete search history.

(56) References Cited

U.S. PATENT DOCUMENTS

| | | | |
|---|---|---|---|
| 5,259,959 A | | 11/1993 | Mulder |
| 6,183,643 B1 | * | 2/2001 | Goodley ............... 210/605 |
| 7,144,508 B2 | * | 12/2006 | Isaka et al. ............ 210/605 |
| 2005/0255539 A1 | * | 11/2005 | Isaka et al. ............ 435/34 |
| 2006/0191846 A1 | * | 8/2006 | Sumino et al. ......... 210/603 |

FOREIGN PATENT DOCUMENTS

| | | | |
|---|---|---|---|
| JP | A-2001-037467 | 2/2001 | |
| JP | A 2003-24985 | 1/2003 | |
| JP | A-2003-024990 | 1/2003 | |
| JP | A 2003-33799 | 2/2003 | |
| JP | A 2003-53385 | 2/2003 | |
| KR | 2002-072360 | * | 9/2002 |

OTHER PUBLICATIONS

Kenji Furukawa et al.; "Mass Cultivation of Anaerobic Ammonium-Oxidizing Sludge Using a novel Nonwoven Biomass Carrier"; *Journal of Chemical Engineering of Japan*; vol. 36, No. 10; pp. 1163-1169; 2003.

Marc Strous et al.; "Ammonium Removal from Concentrated Waste Streams with the Anaerobic Oxidation (Anammox) Process in Different Reactor Configurations"; *Water Research*; vol. 31, No. 8; pp. 1955-1962; 1997.

(Continued)

*Primary Examiner*—Fred Prince
(74) *Attorney, Agent, or Firm*—Oliff & Berridge, PLC

(57) ABSTRACT

A method for operating an anaerobic ammonium oxidation vessel in anaerobic ammonium oxidation in which ammonium and nitrite in water to be treated are simultaneously denitrified by anaerobic ammonium oxidizing bacteria, the method comprising the steps of:

withdrawing a part of the anaerobic ammonium oxidizing bacteria from one anaerobic ammonium oxidation vessel in which the anaerobic ammonium oxidizing bacteria have been acclimatized, and introducing the withdrawn anaerobic ammonium oxidizing bacteria into another anaerobic ammonium oxidation vessel in which acclimatization is to be carried out to perform start-up operation, wherein the anaerobic ammonium oxidizing bacteria having been acclimatized in the one anaerobic ammonium oxidation vessel are provided as microbe-immobilized materials in which the bacteria are attached to and immobilized on immobilizing materials or entrapped and immobilized in immobilizing materials.

23 Claims, 9 Drawing Sheets

OTHER PUBLICATIONS

M. Strous et al.; "The Sequencing batch reactor as a powerful tool for the study of slowly growing anaerobic ammonium-oxidizing microorganisms"; *Applied Microbiology and Biotechnology*; vol. 50, No. 5; pp. 589-596; 1998.

Mike SM Jetten et al.; "Microbiology and application of the anaerobic ammonium oxidation ('anammox') process"; *Current Opinion in Biotechnology*; vol. 12, No. 3; pp. 283-288; 2001; XP-002342916.

* cited by examiner

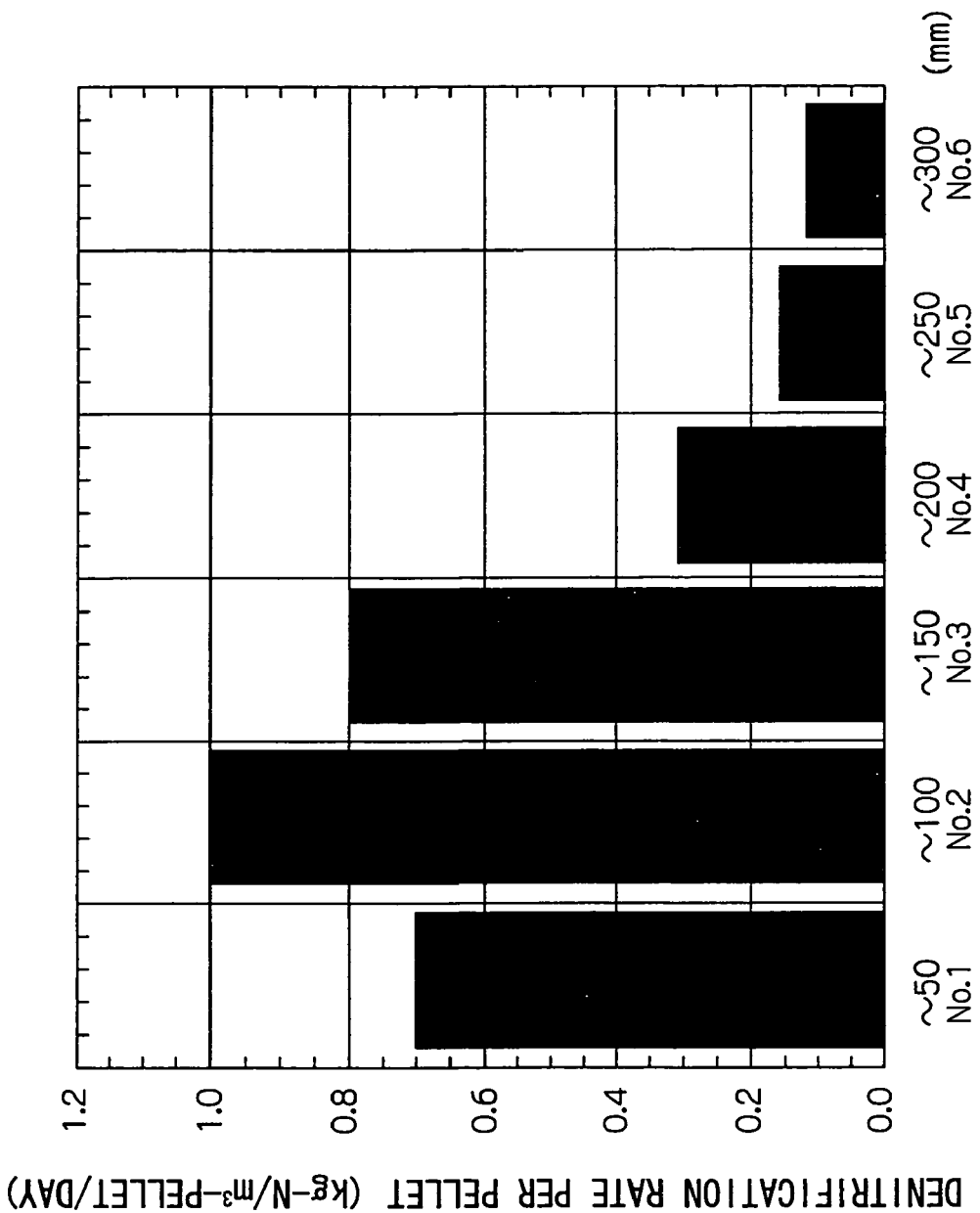

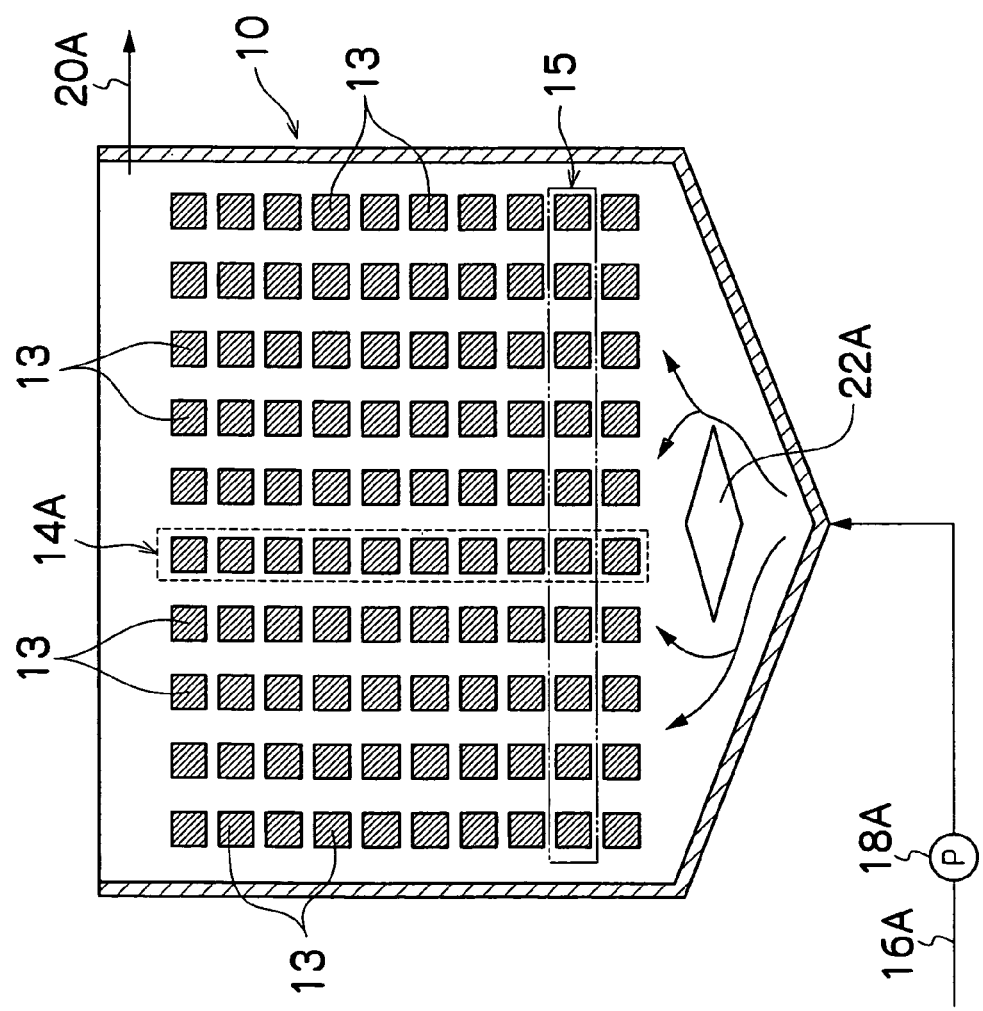

METHOD FOR OPERATING ANAEROBIC AMMONIUM OXIDATION VESSEL AND ANAEROBIC AMMONIUM OXIDATION EQUIPMENT

BACKGROUND OF THE INVENTION

1. Field of the Invention

The present invention relates to a method for operating an anaerobic ammonium oxidation vessel and anaerobic ammonium oxidation equipment, in particular, to a method for operating an anaerobic ammonium oxidation vessel and anaerobic ammonium oxidation equipment, in which ammonium and nitrite in water to be treated are simultaneously denitrified by anaerobic ammonium oxidizing bacteria.

2. Description of the Related Art

Nitrogen components contained in sewage and industrial effluent cause eutrophication in lakes and lower the level of dissolved oxygen in rivers, and thus must be removed. Examples of main nitrogen components contained in sewage and industrial effluent include ammonium nitrogen, nitrite nitrogen, nitrate nitrogen, and organic nitrogen.

Conventionally, when nitrogen in such wastewater has a low concentration, ion exchange and oxidation by chlorine or ozone are used to remove nitrogen. When the nitrogen has a medium or high concentration, biological treatment is employed and usually operated in the following conditions.

In the biological treatment, nitrification and denitrification treatment is performed by aerobic nitrification and anaerobic denitrification. In the aerobic nitrification, ammonium nitrogen and nitrite nitrogen are oxidized by ammonium oxidizing bacteria (Nitrosomonas, Nitrosococcus, Nitrosospira, Nitrosolobus, etc.) and nitrite oxidizing bacteria (Nitrobactor, Nitrospina, Nitrococcus, Nitrospina, etc.). On the other hand, in the anaerobic denitrification, denitrification is performed by heterotrophic bacteria (Pseudomonas denitrificans, etc.).

A nitrification vessel for aerobic nitrification is operated under a load of 0.2 to 0.3 kg-N/m$^3$/day, and a denitrification vessel for anaerobic denitrification is operated under a load of 0.2 to 0.4 kg-N/m$^3$/day. To treat nitrogen contained in a total concentration of 30 to 40 mg/L in sewage, the sewage must be retained in a nitrification vessel for 6 to 8 hours and in a denitrification vessel for 5 to 8 hours, and large-scale treatment vessels are required. Further, a nitrification vessel and a denitrification vessel are designed to be operated under the loads as described above for industrial effluent containing only inorganic substances. However, denitrification of such wastewater requires organic substances, and thus methanol is added at a concentration three to four times of that of nitrogen. For this reason, not only an initial cost but also a large running cost are required.

In this situation, recently, a method for removing nitrogen comprising anaerobic ammonium oxidation has been attracted attention (for example, Japanese Patent Application Laid Open No. 2001-37467). This anaerobic ammonium oxidation is a method comprising simultaneously denitrifying ammonium as a hydrogen donor and nitrite as a hydrogen acceptor by anaerobic ammonium oxidizing bacteria according to the following reaction formula:

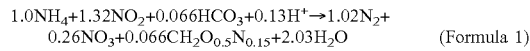
(Formula 1)

This method has advantages in that ammonium used as a hydrogen donor can considerably reduce the amount of methanol or the like used for denitrification and reduce the amount of a sludge produced, etc. Thus, the method is considered to be an effective method for removing nitrogen in the future.

However, it is reported that anaerobic ammonium oxidizing bacteria carrying out anaerobic ammonium oxidation are typified by Planctomycete, and have a very low specific growth rate of 0.001 h$^{-1}$ (Strous, M. et al., Nature, 400, 446 (1999)). Japanese Patent Application Laid Open No. 2003-24990 reports that the bacteria have a very small specific growth rate of 0.02 to 0.05 days$^{-1}$, and it takes 14 to 35 culture days to double the amount of the bacterial cells.

SUMMARY OF THE INVENTION

Therefore, use of an activated sludge in starting up an anaerobic ammonium oxidation vessel utilizing anaerobic ammonium oxidizing bacteria has drawbacks in that the use thereof requires a long acclimatization period which has not yet been experienced and thus is extremely inefficient.

In small-scale laboratory equipment, the start-up period can be reduced by introducing a sludge in which anaerobic ammonium oxidizing bacteria are cultured in advance into an anaerobic ammonium oxidation vessel. On the other hand, in large-scale actual equipment, a culturing plant for culturing anaerobic ammonium oxidizing bacteria is required for reducing the start-up period. However, the culturing plant has drawbacks when actually used in that the plant is huge, and thus not only are high equipment and operation management costs required for operation, but also a large amount of nitrogen wastewater must be controlled for culturing.

As described above, there are problems to be solved for actually operating an anaerobic ammonium oxidation vessel utilizing anaerobic ammonium oxidation, and such an actual anaerobic ammonium oxidation vessel has not been operated in Japan so far.

The present invention has been achieved in view of such circumstances. An object of the present invention is to provide a method for operating an anaerobic ammonium oxidation vessel that can reduce the period for acclimatizing anaerobic ammonium oxidizing bacteria with a low growth rate, eliminates the necessity of providing a culturing plant, and does not reduce performance of one anaerobic ammonium oxidation vessel from which anaerobic ammonium oxidizing bacteria have been withdrawn, and to provide anaerobic ammonium oxidation equipment in which the operation method is carried out.

According to a first aspect of the present invention, to attain the aforementioned object, there is provided a method for operating an anaerobic ammonium oxidation vessel in anaerobic ammonium oxidation in which ammonium and nitrite in water to be treated are simultaneously denitrified by anaerobic ammonium oxidizing bacteria, the method comprising the steps of: withdrawing a part of the anaerobic ammonium oxidizing bacteria from one anaerobic ammonium oxidation vessel in which the anaerobic ammonium oxidizing bacteria have been acclimatized, and introducing the withdrawn anaerobic ammonium oxidizing bacteria into another anaerobic ammonium oxidation vessel in which acclimatization is to be carried out to perform start-up operation, wherein the anaerobic ammonium oxidizing bacteria having been acclimatized in the one anaerobic ammonium oxidation vessel are provided as microbe-immobilized materials in which the bacteria are attached to and immobilized on immobilizing materials or entrapped and immobilized in immobilizing materials.

Based on the concept that an anaerobic ammonium oxidation vessel operated as actual equipment is also used for culturing anaerobic ammonium oxidizing bacteria, and the cultured anaerobic ammonium oxidizing bacteria are withdrawn and employed as seed bacteria for starting up another anaerobic ammonium-oxidation vessel, the present invention is constituted in order to reduce the acclimatization period in the other anaerobic ammonium oxidation vessel and prevent reduction in performance of the one anaerobic ammonium oxidation vessel from which the bacteria have been withdrawn. At the same time, the present invention is constituted so that the anaerobic ammonium oxidizing bacteria having been acclimatized in the one anaerobic ammonium oxidation vessel are provided as microbe-immobilized materials in which the bacteria are attached to and immobilized on immobilizing materials or entrapped and immobilized in immobilizing materials, in order to culture the bacteria efficiently and withdraw the bacteria accurately and easily, etc.

According to the first aspect of the present invention, since anaerobic ammonium oxidizing bacteria having been acclimatized in one anaerobic ammonium oxidation vessel are utilized for acclimatization in another anaerobic ammonium oxidation vessel, the period for acclimatizing anaerobic ammonium oxidizing bacteria with a low growth rate can be reduced, and it is not necessary to provide a culturing plant. By treating anaerobic ammonium oxidizing bacteria as microbe-immobilized materials in which the bacteria are immobilized in or on immobilizing materials, the anaerobic ammonium oxidizing bacteria can be easily withdrawn from one anaerobic ammonium oxidation vessel and easily introduced into another anaerobic ammonium oxidation vessel, and the amount of the bacteria withdrawn or introduced can be accurately controlled.

In the present invention, the acclimatization period refers to a period required for reducing the ammonium nitrogen concentration and the nitrite nitrogen concentration by half at the same time, specifically, a period in which anaerobic ammonium oxidizing bacteria are dominantly proliferated to exhibit anaerobic ammonium oxidation activity. The start-up operation includes, in addition to start-up of a newly provided anaerobic ammonium oxidation vessel, restart-up of an anaerobic ammonium oxidation vessel in which anaerobic ammonium oxidizing bacteria are inactivated. One anaerobic ammonium oxidation vessel and another anaerobic ammonium oxidation vessel may be provided in the same wastewater treatment facility, or may be provided in different wastewater treatment facilities, respectively.

According to a second aspect of the present invention, there is provided the method for operating an anaerobic ammonium oxidation vessel according to the first aspect, wherein the microbe-immobilized materials are withdrawn at one time from the one anaerobic ammonium oxidation vessel in an amount of 25% or less of the total acclimatized microbe-immobilized materials. Here, the 25% may be wt % or vol %.

This is because, if the amount of the microbe-immobilized materials withdrawn at one time from the one anaerobic ammonium oxidation vessel in which the bacteria have been acclimatized is 25% or less based on the total materials, denitrification performance of the one anaerobic ammonium oxidation vessel from which the materials have been withdrawn is not adversely affected. The amount of the microbe-immobilized materials withdrawn at one time is more preferably 10% or less based on the total materials.

According to a third aspect of the present invention, there is provided the method for operating an anaerobic ammonium oxidation vessel according to the first or second aspect, further comprising: acclimatizing an excessive amount of the microbe-immobilized materials in the one anaerobic ammonium oxidation vessel, provided that the microbe-immobilized materials are to be withdrawn.

When an excessive amount of the microbe-immobilized materials are acclimatized in the one anaerobic ammonium oxidation vessel, provided that the microbe-immobilized materials are to be withdrawn, and then the excess of the microbe-immobilized materials is withdrawn in this manner, the anaerobic ammonium oxidation vessel can retain a necessary amount of the microbe-immobilized materials, and denitrification performance is not affected. Specifically, the anaerobic ammonium oxidation vessel is used as a culturing vessel for the excess.

According to a fourth aspect of the present invention, there is provided the method for operating an anaerobic ammonium oxidation vessel according to any one of the first to third aspects, further comprising: withdrawing the acclimatized microbe-immobilized materials from the one anaerobic ammonium oxidation vessel, and substituting new unacclimatized microbe-immobilized materials therefor. Here, unacclimatized pellets refer to pellets having low anaerobic ammonium oxidation activity with a denitrification rate per pellet of 1 (kg-N/m$^3$-pellet/day) or less, and do not necessarily refer to unused articles. Unless specified that the denitrification rate is "per pellet", the denitrification rate and the volume load are estimated "per reaction vessel volume", and are described in a unit (kg-N/m$^3$/day) (hereinafter the same).

When the amount of the microbe-immobilized materials withdrawn is 25% or less of the total acclimatized microbe-immobilized materials, denitrification performance of the one anaerobic ammonium oxidation vessel from which the materials have been withdrawn is almost not affected. However, if the same amount is to be withdrawn in the next time, the amount may exceed 25% of the total remaining materials, meaning that the withdrawal can be carried out only once. However, by withdrawing the microbe-immobilized materials and substituting unacclimatized microbe-immobilized materials therefor at the same time as in the fourth aspect, the amount of the microbe-immobilized materials in the anaerobic ammonium oxidation vessel is not reduced. Accordingly, when this procedure is repeated, the acclimatized microbe-immobilized materials can be withdrawn one after another from the one anaerobic ammonium oxidation vessel to the other anaerobic ammonium oxidation vessel and used as seed bacteria for acclimatization.

According to a fifth aspect of the present invention, there is provided the method for operating an anaerobic ammonium oxidation vessel according to any one of the first to fourth aspects, wherein the microbe-immobilized materials are withdrawn from the one anaerobic ammonium oxidation vessel in a plurality of times so that the total acclimatized microbe-immobilized materials are replaced by the new microbe-immobilized materials over one month or more.

When the microbe-immobilized materials are withdrawn from the one anaerobic ammonium oxidation vessel many times in a short period, microbe-immobilized materials not sufficiently acclimatized exist at a large percentage in the anaerobic ammonium oxidation vessel from which the materials have been withdrawn, and thus denitrification performance deteriorates. Accordingly, when adjusting the frequency of withdrawal so that the acclimatized microbe-immobilized materials are withdrawn in a plurality of times to replace the total materials by new microbe-immobilized materials substituted therefor over one month or more, and preferably two months or more, there is a progress in the acclimatization of the new microbe-immobilized materials substituted therefor, and thus denitrification performance is less affected. The microbe-immobilized materials are preferably withdrawn uniformly. Specifically, the amount of the materials withdrawn in a plurality of times is preferably the same each time. This is because denitrification performance tends to vary if the amount of the materials withdrawn differs each time.

According to a sixth aspect of the present invention, there is provided the method for operating an anaerobic ammonium oxidation vessel according to any one of the first to fifth aspects, further comprising: withdrawing the microbe-immobilized materials uniformly from an area parallel to the flow direction of water to be treated flowing in the one anaerobic ammonium oxidation vessel.

This is because there is a denitrification rate distribution in the anaerobic ammonium oxidation vessel in which the denitrification rate is high on the inlet side for water to be treated and the denitrification rate is low on the outlet side for treated water, and, when the microbe-immobilized materials are withdrawn from an area perpendicular to the flow direction of water to be treated, denitrification performance of the anaerobic ammonium oxidation vessel may significantly deteriorate if such an area is on the inlet side for water to be treated. When widening the area parallel to the flow direction of water to be treated, a large amount of the microbe-immobilized materials are withdrawn. When narrowing the area, a small amount of the materials are withdrawn.

According to a seventh aspect of the present invention, there is provided the method for operating an anaerobic ammonium oxidation vessel according to the sixth aspect, wherein the microbe-immobilized materials are obtained by attaching microbes to fixed beds and formed as a plurality of units which are parallel to the flow direction of water to be treated, and the units are withdrawn.

When the microbe-immobilized materials are fixed bed-type materials and are immersed in the anaerobic ammonium oxidation vessel as a plurality of units parallel to the flow direction of water to be treated in this manner, the microbe-immobilized materials can be withdrawn from an area parallel to the flow direction of water to be treated by withdrawing the units.

According to an eighth aspect of the present invention, to attain the aforementioned object, there is provided anaerobic ammonium oxidation equipment which is configured to carry out the method for operating an anaerobic ammonium oxidation vessel of any one of the first to seventh aspects.

According to a ninth aspect of the present invention, to attain the aforementioned object, there is provided anaerobic ammonium oxidation equipment in which ammonium and nitrite in water to be treated are simultaneously denitrified by anaerobic ammonium oxidizing bacteria, the equipment comprising: an acclimatization-completed vessel in which the anaerobic ammonium oxidizing bacteria have been acclimatized; an acclimatization-uncompleted vessel in which the anaerobic ammonium oxidizing bacteria are to be acclimatized; a plurality of units which are provided in at least the acclimatization-completed vessel selected from the acclimatization-completed vessel and the acclimatization-uncompleted vessel and in which fixed beds, on which microbes containing the anaerobic ammonium oxidizing bacteria are immobilized, are arranged parallel to the flow direction of the water to be treated; and a casing which detachably supports the plurality of units, wherein, when the acclimatization-uncompleted vessel is started up with the anaerobic ammonium oxidizing bacteria in the acclimatization-completed vessel as seed bacteria, the units are withdrawn from the acclimatization-completed vessel in their entirety and placed in the acclimatization-uncompleted vessel.

According to the ninth aspect, since microbes containing the anaerobic ammonium oxidizing bacteria are immobilized on fixed beds, and the fixed beds are detachably supported by a casing as a plurality of units parallel to the flow direction of water to be treated, in at least the acclimatization-completed vessel selected from the acclimatization-completed vessel and the acclimatization-uncompleted vessel acclimatized anaerobic ammonium oxidizing bacteria can be surely withdrawn from an area parallel to the flow direction of water to be treated by withdrawing the units. Accordingly, even if acclimatized anaerobic ammonium oxidizing bacteria are withdrawn from the acclimatization-completed vessel as seed bacteria and introduced into the acclimatization-uncompleted vessel to start up the acclimatization-uncompleted vessel, denitrification performance of the acclimatization-completed vessel does not significantly deteriorate.

As described above, since the method for operating an anaerobic ammonium oxidation vessel of the present invention involves utilizing anaerobic ammonium oxidizing bacteria having been acclimatized in one anaerobic ammonium oxidation vessel for acclimatization in another anaerobic ammonium oxidation vessel, the method can reduce the period for acclimatizing anaerobic ammonium oxidizing bacteria with a low growth rate, eliminates the necessity of providing a culturing plant, and does not reduce performance of the one anaerobic ammonium oxidation vessel from which anaerobic ammonium oxidizing bacteria have been withdrawn.

BRIEF DESCRIPTION OF THE DRAWINGS

FIG. 6 is a view for describing the distribution of denitrification rates in an acclimatization-completed vessel;

FIG. 7 is a view for describing an area from which microbe-immobilized materials are withdrawn in order to avoid deterioration of denitrification performance of an acclimatization-completed vessel;

DETAILED DESCRIPTION OF THE PREFERRED EMBODIMENTS

Preferred embodiments of the method for operating an anaerobic ammonium oxidation vessel and the anaerobic ammonium oxidation equipment in which the operation method is carried out of the present invention will be described in detail in accordance with the attached drawings.

Figure 1:
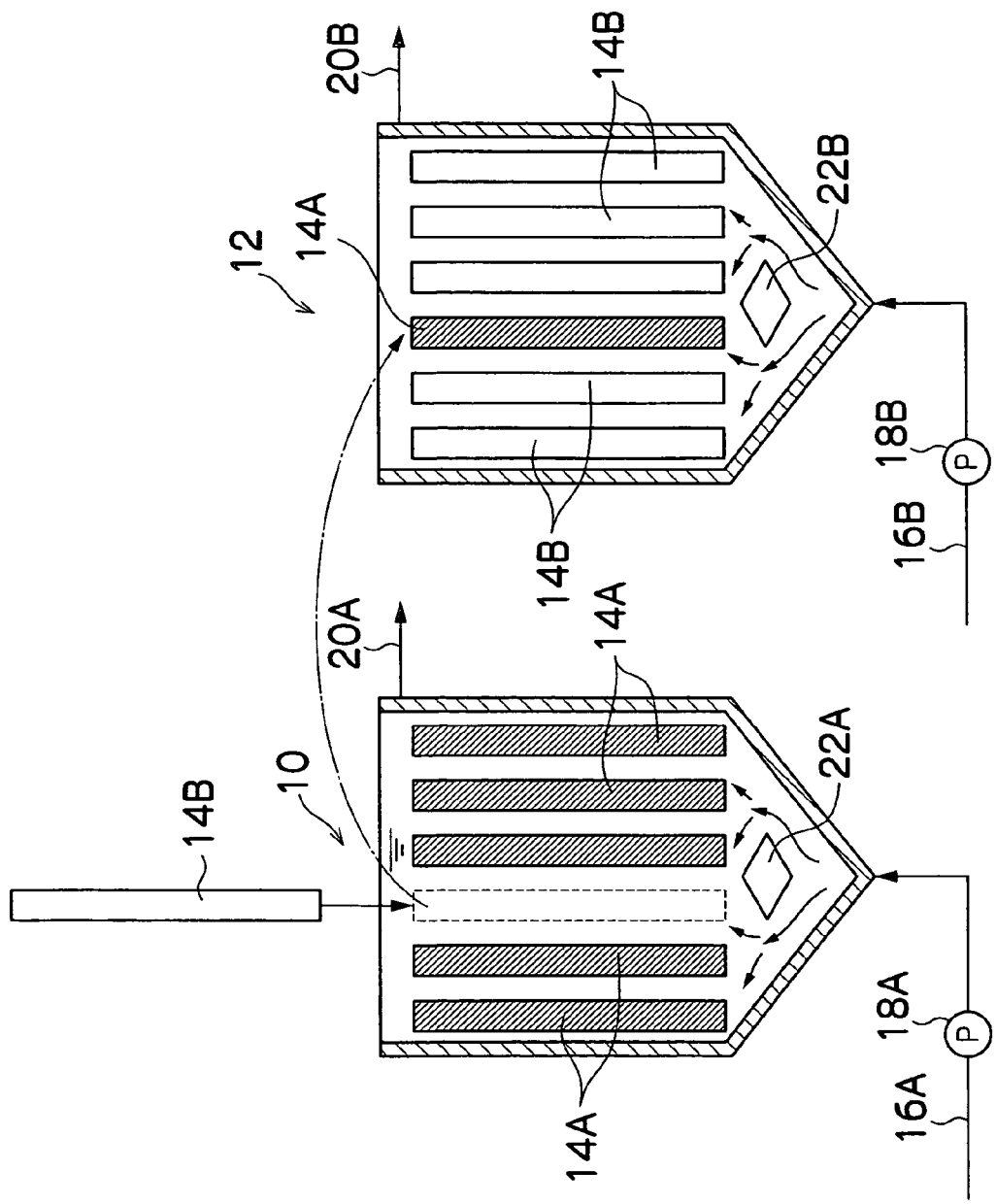
FIG. 1 is a conceptual view showing anaerobic ammonium oxidation equipment in which the method for operating an anaerobic ammonium oxidation vessel of the present invention is carried out.

FIG. 1 is a conceptual view showing anaerobic ammonium oxidation equipment in which the method for operating an anaerobic ammonium oxidation vessel of the present invention is carried out.

FIG. 1 shows two vertical anaerobic ammonium oxidation vessels, one of which is an anaerobic ammonium oxidation vessel having acclimatized microbe-immobilized materials 14A in which anaerobic ammonium oxidizing bacteria have grown dominantly (hereinafter referred to as "acclimatization-completed vessel 10"), and the other of which is an anaerobic ammonium oxidation vessel having unacclimatized microbe-immobilized materials 14B in which anaerobic ammonium oxidizing bacteria have not yet grown dominantly (hereinafter referred to as "acclimatization-uncompleted vessel 12"), the vessel to be started up. The microbe-immobilized materials 14A and 14B of the present embodiment are described taking as an example fixed bed-type microbe-immobilized materials 14A and 14B in which microbes are attached to and immobilized on the periphery of a nonwoven cloth. However, the microbe-immobilized materials 14A and 14B are not limited thereto. For example, an attachment and flow-type microbe-immobilized material in which microbes are attached to and immobilized on the periphery of a granular immobilizing material such as a gel or resin beads which can flow in a vessel may be used, or an entrapping and flow-type microbe-immobilized material in which microbes are entrapped and immobilized in an aqueous gel and which can flow freely in a vessel may be used.

Examples of the material for an immobilizing material include, but are not specifically limited to, gels of polyvinyl alcohol, alginic acid, and polyethylene glycol; and plastic materials of cellulose, polyester, polypropylene, and vinyl chloride. An immobilizing material formed in the shape of a sphere, a cylinder, a porous material, a cube, a sponge, a honeycomb, or the like is preferably used. Further, granules utilizing self-granulation of microbes may be used in the present invention.

The microbe-immobilized materials 14A and 14B using a bar-like nonwoven cloth as an immobilizing material are vertically immersed in water to be treated in the acclimatization-completed vessel 10 and the acclimatization-uncompleted vessel 12. Water to be treated supplied to the bottom of the vessels 10 and 12 through raw water pipes 16A and 16B by raw water pumps 18A and 18B flow in the vessels 10 and 12 as an upward flow, and are discharged from the upper parts of the vessels 10 and 12 through treated water pipes 20A and 20B. Here, the microbe-immobilized material 14A indicated by black in FIG. 1 refers to an acclimatized microbe-immobilized material in which anaerobic ammonium oxidizing bacteria have grown dominantly, and the microbe-immobilized material 14B indicated by white in FIG. 1 refers to an unacclimatized microbe-immobilized material or a newly substituted microbe-immobilized material in which anaerobic ammonium oxidizing bacteria have not yet grown dominantly.

Dispersion boards 22A and 22B are provided in the bottom of inside the acclimatization-completed vessel 10 and the acclimatization-uncompleted vessel 12. Water to be treated flowing from the raw water pipes 16A and 16B forms an upward flow that is uniform inside the whole vessels 10 and 12 and, at the same time, prevents formation of a local region with a high nitrite nitrogen ($NO_2$—N) concentration and inactivation of anaerobic ammonium oxidizing bacteria.

Figure 2:
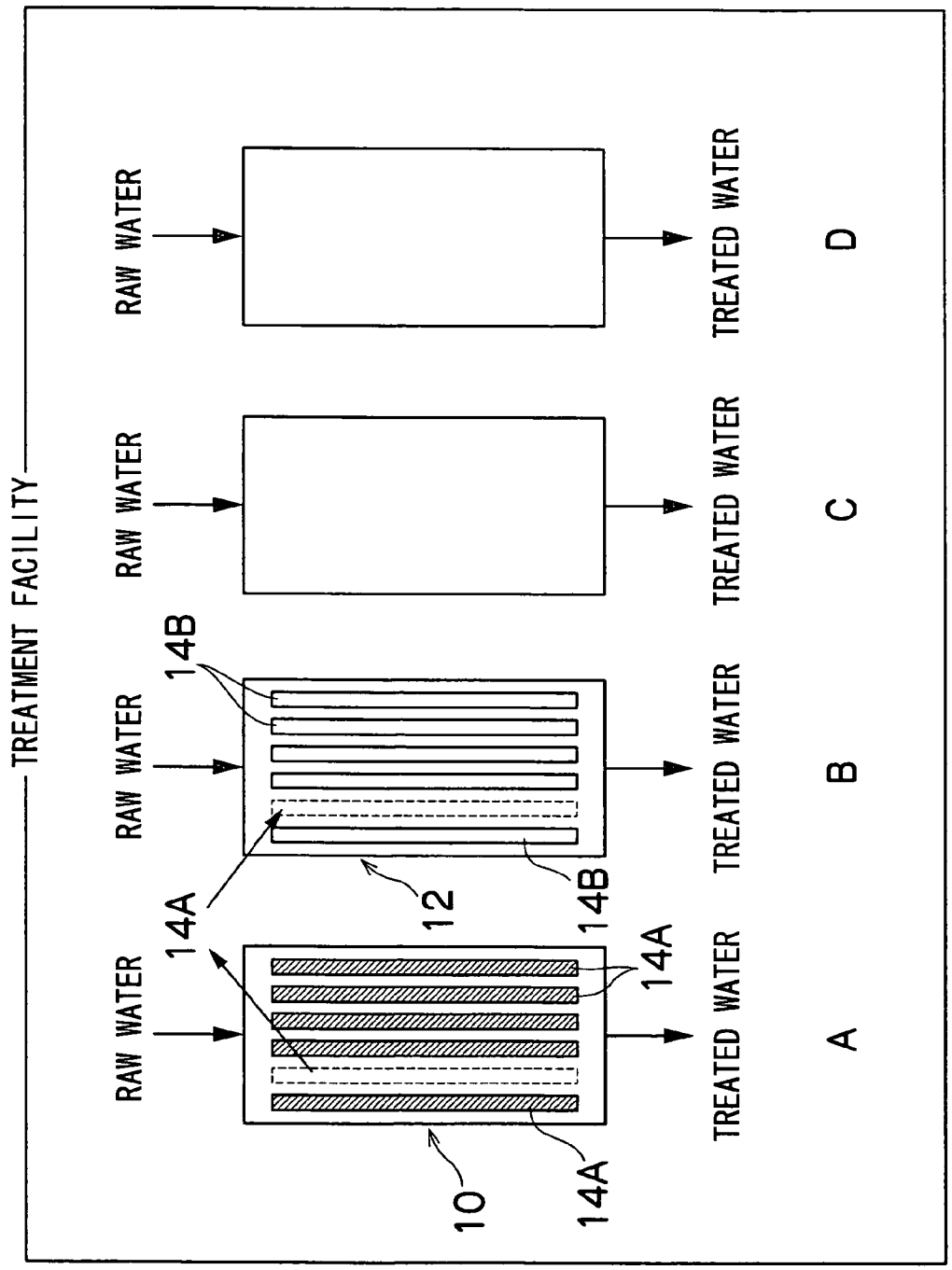
FIG. 2 is a schematic view showing a case where the method for operating an anaerobic ammonium oxidation vessel of the present invention is carried out in the same wastewater treatment facility.
Figure 3:
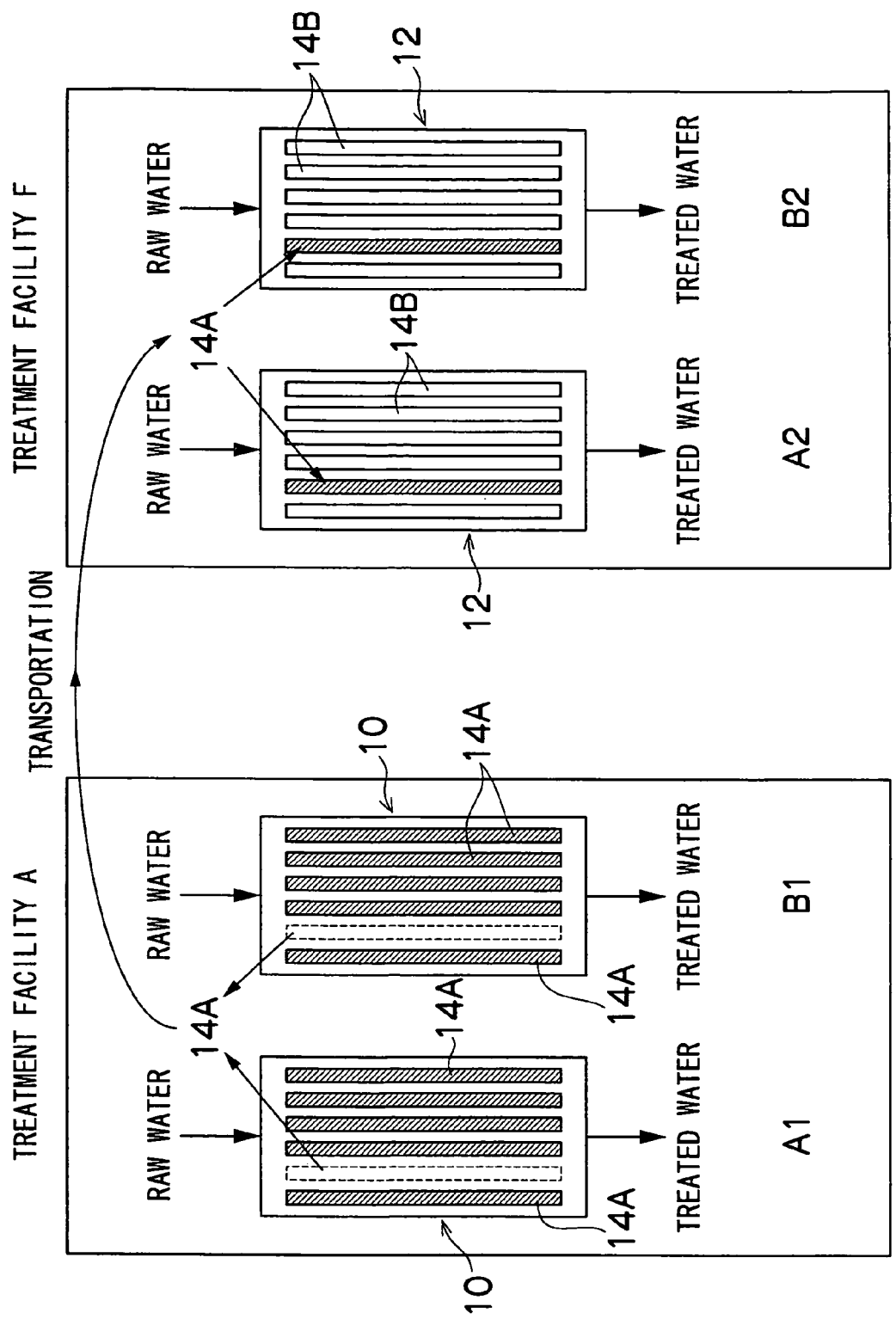
FIG. 3 is a schematic view showing a case where the method for operating an anaerobic ammonium oxidation vessel of the present invention is carried out in different wastewater treatment facilities.

As shown in FIGS. 2 and 3, the acclimatization-completed vessel 10 and the acclimatization-uncompleted vessel 12 may be provided in the same wastewater treatment facility or in different wastewater treatment facilities.

FIG. 2 shows that, in the same wastewater treatment facility, the acclimatized microbe-immobilized materials 14A are moved from the acclimatization-completed vessel 10 of line A in which anaerobic ammonium oxidizing bacteria have been already acclimatized (in operation) to the acclimatization-uncompleted vessel 12 of line B in which start-up operation is to be carried out. In this manner, when many treatment lines A, B, C, and D are operated in the same wastewater treatment facility, anaerobic ammonium oxidizing bacteria in a treatment line started up in advance can be used as a seed sludge for another treatment line.

FIG. 3 shows that the acclimatized microbe-immobilized materials 14A are moved from a wastewater treatment facility A in which anaerobic ammonium oxidizing bacteria have been already acclimatized (in operation) to a wastewater treatment facility F in which start-up operation is to be carried out. In this manner, in the different wastewater treatment facilities A and F, a sludge of the wastewater treatment facility A started up in advance can be transported to the other wastewater treatment facility F in which operation is to be started.

In order to carry out the method for carrying out an anaerobic ammonium oxidation vessel of the present invention by employing such acclimatization-completed vessel 10 and acclimatization-uncompleted vessel 12, as shown in FIG. 1, some of the acclimatized microbe-immobilized materials 14A are withdrawn from the acclimatization-completed vessel 10 and introduced into the acclimatization-uncompleted vessel 12. The unacclimatized microbe-immobilized materials 14B are substituted therefor in the acclimatization-completed vessel 10 to continue the operation. On the other hand, the microbe-immobilized materials 14A from the acclimatization-completed vessel 10 are added to the acclimatization-uncompleted vessel 12 to carry out start-up operation. In this case, the acclimatized microbe-immobilized materials 14A are not necessarily used as is. Immobilized anaerobic ammonium oxidizing bacteria may be stripped and added to the acclimatization-uncompleted vessel 12 as an acclimatized sludge.

Figure 4:
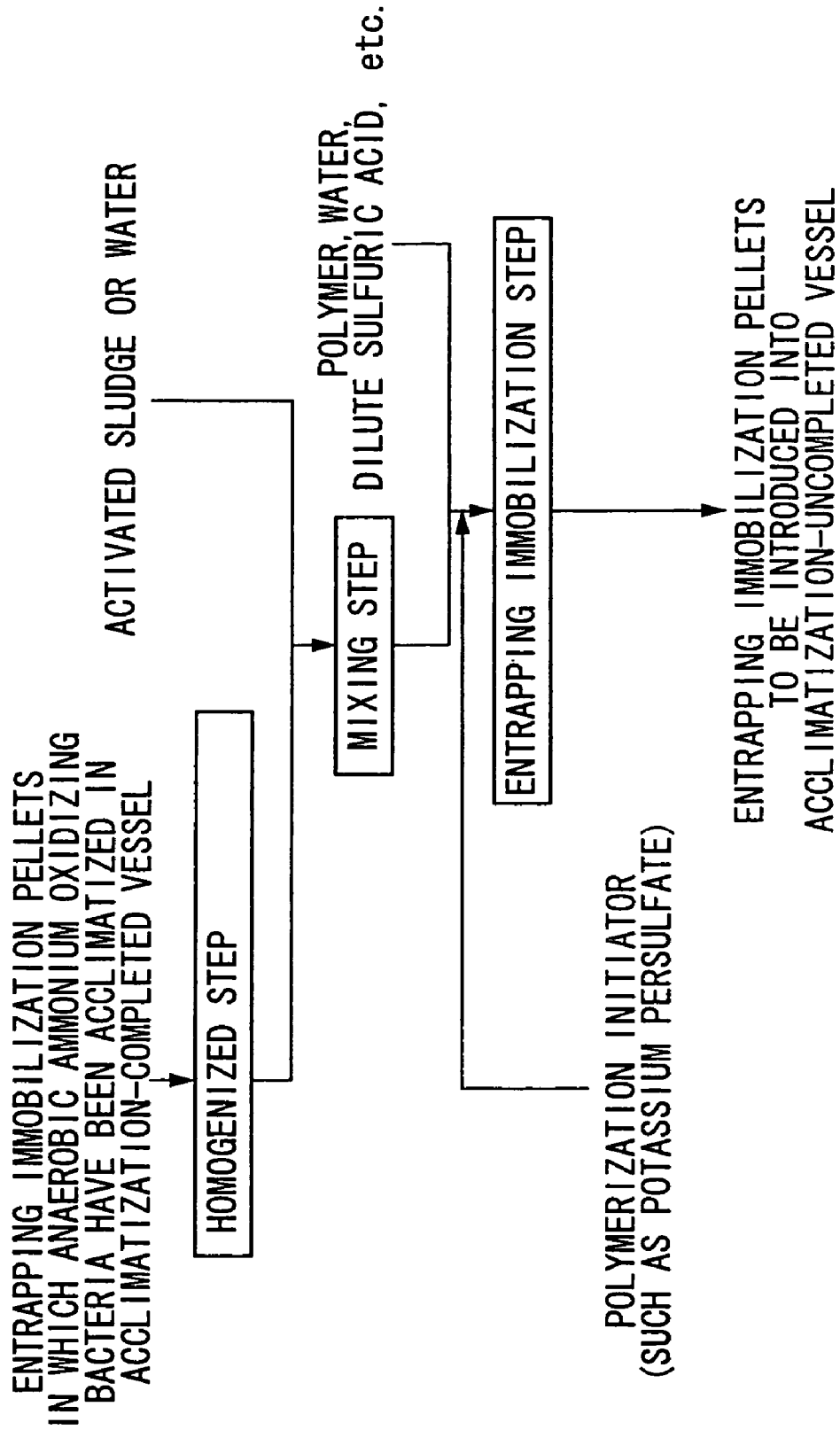
FIG. 4 is a view for describing a method for producing entrapping immobilization pellets introduced into an acclimatization-uncompleted vessel when microbe-immobilized materials having been acclimatized in an acclimatization-completed vessel are entrapping immobilization pellets.

In such an operation method of the present invention, when the microbe-immobilized materials 14A acclimatized in the acclimatization-completed vessel 10 are entrapping immobilization pellets, and some of the total entrapping immobilization pellets in the acclimatization-completed vessel 10 are to be introduced into the acclimatization-uncompleted vessel 12, it is sufficient to increase the number of the entrapping immobilization pellets to be introduced into the acclimatization-uncompleted vessel 12 according to a method for producing entrapping immobilization pellets shown in FIG. 4.

As shown in FIG. 4, the entrapping immobilization pellets withdrawn from the acclimatization-completed vessel 10 are homogenized by a homogenizer or the like (liquefaction step). In this time, it is preferable to add hydrazine as an intermediate metabolite of anaerobic ammonium oxidizing bacteria and as a reducing agent that prevents inclusion of oxygen, and/or hydroxylamine as an intermediate metabolite of anaerobic ammonium oxidizing bacteria. Next, water or an activated sludge is mixed with the homogenized entrapping immobilization pellets (mixing step). Next, the mixture obtained in the mixing step is mixed with a polymer as an entrapping immobilization material, while water and dilute sulfuric acid as reaction adjustment agent is added to the gelling material. Then, a polymerization initiator such as potassium persulfate is added to cause polymerization reaction, so that the polymer is gelled and the mixture is entrapped and immobilized in the gelling material (entrapping immobilization step). In this manner, the number of the entrapping immobilization pellets can be increased by mixing the homogenized entrapping immobilization pellets with an activated sludge and thereby increasing the amount of the pellets, and the produced entrapping immobilization pellets have anaerobic ammonium oxidizing bacteria more dominant than other bacteria therein and can be easily acclimatized.

When the unacclimatized microbe-immobilized materials 14B used for substitution in the acclimatization-completed vessel 10 and the unacclimatized microbe-immobilized materials 14B to be introduced into the acclimatization-uncompleted vessel 12 are an attachment and immobilization-type, it is possible to introduce the materials 14B after attaching microbes of a sludge or the like to immobilizing materials thereof in advance. In this case, since an organic substance attached to the sludge inhibits acclimatization of anaerobic ammonium oxidizing bacteria, it is preferable to introduce acclimatized anaerobic ammonium oxidizing bacteria after reducing the BOD concentration in the vessels to 50 mg/L or less. Alternatively, immobilizing materials to which microbes are not attached may be introduced to cause the microbes to be attached to the immobilizing materials during operation.

Table 1 shows the experimental results for describing that the period for acclimatizing anaerobic ammonium oxidizing bacteria with a low growth rate can be reduced by carrying out such an operation method of the present invention.

In the tests, the acclimatization-uncompleted vessel 12 configured as laboratory equipment was started up employing anaerobic ammonium oxidation with inorganic synthetic wastewater. In Table 1, the term "added" refers to a case where the acclimatized microbe-immobilized materials 14A were introduced into the acclimatization-uncompleted vessel 12, and an acclimatized sludge itself floating in the acclimatization-completed vessel 10 was also added to the vessel 12, while the term "not added" refers to a case where an acclimatized sludge was not added.

TABLE 1

| Microbe-immobilized materials | Sludge | Denitrification rate (kg-N/m$^3$/day) | Number of operation days |
|---|---|---|---|
| Test 1 | Nonwoven cloth (unacclimatized) | Sewage sludge | 0.45 | 220 |
| Test 2 | Nonwoven cloth (unacclimatized) | Nitrified sludge | Cannot be determined | 180 |
| Test 3 | Nonwoven cloth (acclimatized) | Not added | 3.0 | 52 |
| Test 4 | Nonwoven cloth (acclimatized) | Added | 3.3 | 40 |
| Test 5 | Entrapping immobilization pellets | Added * | 3.3 | 31 |
| Test 6 | PVA gel beads | Added * | 1.8 | 60 |
| Test 7 | Granules | Not added | 3.5 | 50 |
| Test 8 | Entrapping immobilization pellets | Added | 10.0 | 31 |

* acclimated anaerobic ammonium oxidiging bacteria

In Test 1, the acclimatization-uncompleted vessel 12 was started up by introducing into the vessel 12 a nonwoven cloth to which an activated sludge, in which anaerobic ammonium oxidizing bacteria had not been acclimatized, was attached.

For the start-up operation, an unused nonwoven cloth was immersed in a sewage sludge (sludge concentration: MLSS 30,000 mg/L) to attach the sewage sludge to the nonwoven cloth which was then introduced into the acclimatization-uncompleted vessel 12. In addition to the nonwoven cloth to which the sewage sludge was attached, the sewage sludge itself was added to the acclimatization-uncompleted vessel 12. As the raw water composition, a composition shown in Table 2 was used with reference to A. A. van de Graaf et al., Microbiology (1996), 142, pp. 2187-2196. The operation was carried out by changing the nitrite nitrogen ($NO_2$—N) concentration and the ammonium nitrogen ($NH_4$—N) concentration.

TABLE 2

| Substrate | Amount added |
|---|---|
| $NaNO_2$ | 172-1330 (mg/L) |
| $(NH_4)SO_4$ | 175-1350 (mg/L) |
| $KHCO_3$ | 500 (mg/L) |
| $KH_2PO_4$ | 27 (mg/L) |
| $MgSO_4 \cdot 7H_2O$ | 300 (mg/L) |
| $CaCl_2 \cdot 2H_2O$ | 180 (mg/L) |
| T. Ellement S 1 | 1 (mL/L) |
| T. Ellement S 2 | 1 (mL/L) |

Remarks

T. Ellement S1: EDTA: 5 g/L, $FeSO_4$: 5 g/L

T. Ellement S2: EDTA: 15 g/L, $ZnSO_4.7H_2O$: 0.43 g/L, $CoCl_2.6H_2O$: 0.24 g/L, $MnCl_2.4H_2O$: 0.99 g/L, $CuSO_4.5H_2O$: 0.25 g/L, $NaMoO_4.2H_2O$: 0.22 g,L, $NiCl_2.6H_2O$: 0.19 g/L, $NaSeO_4.10H_2O$: 0.21 g/L, $H_3BO_4$: 0.014 g/L As a result, simultaneous denitrification of ammonium and nitrite was initiated nearly on the 124th day after the start of the operation in the acclimatization-uncompleted vessel 12, and anaerobic ammonium oxidation activity was determined. Then, a denitrification rate of 0.45 (kg-N/m$^3$/day) was determined on the 220th day. In Test 1, the acclimatization period was 220 days, but the attained sufficient denitrification rate utilizing anaerobic ammonium oxidation was still not sufficient.

In Test 2, the acclimatization-uncompleted vessel 12 was started up by introducing into the vessel 12 a nonwoven cloth to which a nitrified sludge was attached. The nitrified sludge was a sludge sampled from a nitrification vessel of nitrification and denitrification equipment. For the operation, an unused nonwoven cloth was immersed in a nitrified sludge (sludge concentration: MLSS 30,000 mg/L) first to attach the nitrified sludge to the nonwoven cloth. In addition to the nonwoven cloth to which the nitrified sludge was attached, the nitrified sludge itself was added to the acclimatization-uncompleted vessel 12. The amount of the sludge itself added was the same as the amount of the sludge itself added in Test 1. In the following tests, the amount of the sludge itself if added is the same as the amount of the sludge itself added in Test 1 or 2. Other conditions were the same as in Test 1.

As a result, simultaneous denitrification of ammonium and nitrite was not initiated even 180 days after the start of the operation, and anaerobic ammonium oxidation activity could not be determined. Specifically, anaerobic ammonium oxidizing bacteria were not dominantly proliferated by acclimatization, and the acclimatization-uncompleted vessel 12 could not be started up.

As is clear from Tests 1 and 2, when using unacclimatized microbe-immobilized materials in which anaerobic ammonium oxidizing bacteria are not dominantly growth, the acclimatization-uncompleted vessel 12 cannot be started up, or it takes an extremely long period required even if the vessel can be started up.

Tests 3 to 7 relate to the operation method of the present invention, in which the acclimatized microbe-immobilized materials 14A were withdrawn from the acclimatization-completed vessel 10 operated beforehand and introduced into the acclimatization-uncompleted vessel 12 to start up the acclimatization-uncompleted vessel 12. Specifically, the acclimatized microbe-immobilized materials 14A using a nonwoven cloth as a fixed bed were introduced into the acclimatization-completed vessel 10 operated beforehand at an apparent packing ratio of 80%. The vessel 10 was operated at a denitrification rate of 3 to 5 (kg-N/m$^3$/day) using inorganic synthetic wastewater in which the nitrite nitrogen ($NO_2$—N) concentration and the ammonium nitrogen ($NH_4$—N) concentration were respectively adjusted to 200 mg/L and 250 mg/L as shown in Table 2. In this manner, seed bacteria beds using the above-described nonwoven cloth as a fixed bed were used as the microbe-immobilized materials 14A in the acclimatization-completed vessel 10 in Tests 3 to 7, and the seed bacteria beds were added to the acclimatization-uncompleted vessel 12. The tests were carried out in a manner that the amount of the acclimatized sludge was almost the same. In the tests, the form of the microbe-immobilized materials 14A in the acclimatization-completed vessel 10 was a nonwoven cloth as a fixed bed. However, the form is not limited thereto. Further, the form of the microbe-immobilized materials added to the acclimatization-uncompleted vessel 12 is not limited to a nonwoven cloth. The tests were carried out in various manners using entrapping immobilization pellets, PVA gel beads, and granules, in addition to a nonwoven cloth.

In Test 3, 5% of the total acclimatized microbe-immobilized materials 14A were withdrawn from the acclimatization-completed vessel 10 and introduced into the acclimatization-uncompleted vessel 12, and the unused microbe-immobilized materials 14B to which an unacclimatized activated sludge was attached were introduced into the vessel 12 for the rest (95%) of the total microbe-immobilized materials in the vessel 12. The acclimatized sludge itself in the acclimatization-completed vessel 10 was not added. As a result, the denitrification rate in the acclimatization-uncompleted vessel 12 reached 3.0 (kg-N/m$^3$/day) 52 days after the start of the operation, and anaerobic ammonium oxidation activity the same as in the acclimatization-completed vessel 10 could be obtained. Specifically, the acclimatization period in Test 3 was 52 days, and a sufficient denitrification rate utilizing anaerobic ammonium oxidation could be obtained.

In Test 4, 5% of the acclimatized microbe-immobilized materials 14A were withdrawn from the acclimatization-completed vessel 10, and 80% of the withdrawn materials were introduced into the acclimatization-uncompleted vessel 12, and the sludge stripped from 20% of the withdrawn materials were introduced into the acclimatization-uncompleted vessel 12. As a result, the nitrification rate in the acclimatization-uncompleted vessel 12 reached 3.3 (kg-N/m$^3$/day) 40 days after the start of the operation, and the test results were better than those in Test 3 because of the addition of an acclimatized sludge itself. The acclimatization period in Test 4 was 40 days, and a sufficient denitrification rate utilizing anaerobic ammonium oxidation could be obtained.

In Test 5, 5% of the acclimatized microbe-immobilized materials 14A were withdrawn from the acclimatization-completed vessel 10, the sludge was stripped from the withdrawn materials 14A and mixed with an activated sludge to prepare a mixture, the mixture was immobilized in a polyethylene glycol gel, and the gel was formed into pellets to obtain entrapping immobilization pellets. The gel concentration was 15 wt %, and the concentration of the mixture in the pellets were 1.5 wt %.

The entrapping immobilization pellets were introduced into the acclimatization-uncompleted vessel 12 at a pellet packing ratio of 30% to carry out the test. As a result, the denitrification rate in the acclimatization-uncompleted vessel 12 reached 3.3 (kg-N/m$^3$/day) about one month (31 days) after the start of the operation, and acclimatization could be carried out in a period shorter than in Test 4.

In Test 6, 5% of the acclimatized microbe-immobilized materials 14A were withdrawn from the acclimatization-completed vessel 10, the sludge was stripped from the withdrawn materials 14A, gel beads made of PVA (polyvinyl alcohol) were immersed in the sludge for 24 hours, and then the sludge and the PVA gel beads were introduced into the acclimatization-uncompleted vessel 12. The acclimatization-uncompleted vessel 12 was packed with the PVA gel beads in an apparent volume of 50%. As a result, the acclimatization-uncompleted vessel 12 could be started up so that the denitrification rate reached 1.8 (kg-N/m$^3$/day) 60 days after the start of the operation, which was lower than in the above-described Tests 3, 4, and 5, however. The denitrification rate was lower than in Tests 3, 4, and 5, presumably because a part of the acclimatized sludge attached to the PVA gel beads was stripped and flew out from the vessel.

In Test 7, 5% of the acclimatized microbe-immobilized materials 14A were withdrawn from the acclimatization-completed vessel 10, the sludge was stripped from the withdrawn materials 14A, granules were immersed in the sludge for 24 hours, and then the acclimatization-uncompleted vessel 12 was packed with the sludge and the granules. The acclimatization-uncompleted vessel 12 was packed with the granules in an apparent volume of 40%, and operated with UASB equipment. As a result, the denitrification rate in the acclimatization-uncompleted vessel 12 reached 3.5 (kg-N/m$^3$/day) 50 days after the start of the operation, and anaerobic ammonium oxidation activity the same as in the acclimatization-completed vessel 10 could be obtained. Specifically, the acclimatization period in Test 7 was 50 days, and a sufficient denitrification rate utilizing anaerobic ammonium oxidation could be obtained.

The entrapping immobilization pellets were withdrawn from the equipment in which wastewater treatment experimentation is performed using entrapping immobilization of anaerobic ammonium oxidizing bacteria. Liquid in which the withdrawn pellets are homogenized is pellets sludge. This sludge is diluted at a dilution factor of 10 and is put under entrapping immobilization again. The pellets before homogenizing had activity of a denitrification rate of 10 (kg-N/m$^3$/day) per a pellet. The sludge was immobilized in a polyethylene glycol gel in the entrapping immobilization. The gel concentration was 10 wt %. As a result, the denitrification rate per a pellet reached 10 (kg-N/m$^3$/day) about one month (31 days) after the start of the operation.

As is clear from the results of Tests 3 to 8, the acclimatization period was one to two months when the operation period of the present invention was carried out. Thus, the unacclimatized microbe-immobilized materials 14B that are substituted in the acclimatization-completed vessel 10 require an acclimatization period of one month or more, and preferably two months or more. Accordingly, it is preferable to withdraw a small amount of the acclimatized microbe-immobilized materials 14A each from the acclimatization-completed vessel 10 in divided times at a frequency at which the total the microbe-immobilized materials 14A are replaced by the microbe-immobilized materials 14B substituted therefor over one month or more, and more preferably over two months or more. If the frequency of withdrawal is higher than above, many unacclimatized microbe-immobilized materials exist in the acclimatization-completed vessel 10, and denitrification performance of the acclimatization-completed vessel 10 is caused to deteriorate.

In the operation method of the present invention, the amount of the microbe-immobilized materials 14A withdrawn at one time from the acclimatization-completed vessel 10 is preferably 25% or less of the total microbe-immobilized materials 14A in the acclimatization-completed vessel 10.

Figure 5:
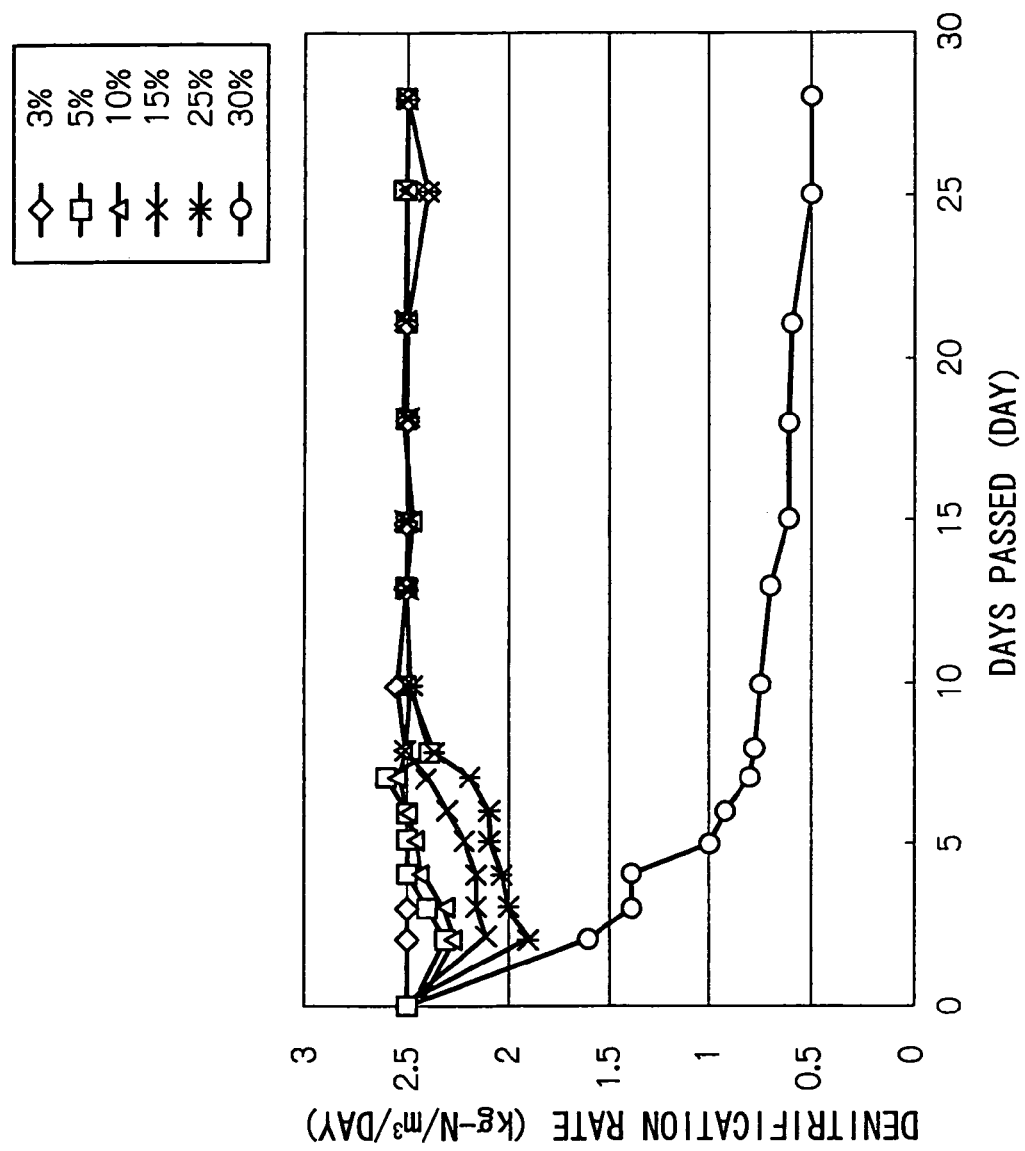
FIG. 5 is a diagram showing the relation between the amount of the microbe-immobilized materials withdrawn at one time from an acclimatization-completed vessel and the denitrification rate.

FIG. 5 shows the test results obtained by examining the relation between the amount of the microbe-immobilized materials 14A withdrawn at one time from the acclimatization-completed vessel 10 and denitrification performance in the acclimatization-completed vessel 10. Denitrification performance was evaluated by measuring the denitrification rate.

The test used inorganic synthetic wastewater in which the nitrite nitrogen ($NO_2$—N) concentration and the ammonium nitrogen ($NH_4$—N) concentration were respectively adjusted to 220 mg/L and 200 mg/L as shown in Table 2. Six acclimatization-completed vessels 10 (laboratory equipments) operated at an HRT of three hours were prepared. As the immobilizing material for the microbe-immobilized materials 14A, a nonwoven cloth was used. In all six vessels, the denitrification rate before withdrawing the microbe-immobilized materials 14A was 2.5 (kg-N/m$^3$/day).

3%, 5%, 10%, 15%, 25%, and 30% of the microbe-immobilized materials 14A based on the total microbe-immobilized materials 14A were withdrawn from the six acclimatization-completed vessels 10, respectively.

The results are shown in FIG. 5. In FIG. 5, the horizontal axis indicates the days passed since the microbe-immobilized materials 14A had been withdrawn, and the vertical axis indicates the denitrification rates in the acclimatization-completed vessels 10. As is clear from FIG. 5, when the amount of the withdrawn materials 14A was 10% or less, the denitrification rate was almost not reduced if days passed since the materials 14A had been withdrawn. When the amount of the withdrawn materials 14A was 15% or 25%, the denitrification rate was reduced a little in a period between the time immediately after the withdrawal and about 10 days after the withdrawal, and the denitrification rate was recovered to the original rate 10 days after the withdrawal. However, when the amount of the withdrawn materials 14A was 30%, the denitrification rate was rapidly reduced as days passed since the materials 14A had been withdrawn. The denitrification rate was rapidly reduced to about 1 (kg-N/m$^3$/day) when five days passed since the materials 14A had been withdrawn, and was not recovered to the original rate even when 30 days passed.

The results in FIG. 5 show that the amount of the acclimatized microbe-immobilized materials 14A to be withdrawn at one time from the acclimatization-completed vessel 10 is preferably 25% or less, more preferably 10% or less, and particularly preferably 5% or less of the total microbe-immobilized materials 14A.

Accordingly, when the acclimatization-completed vessel 10 is also used as a vessel for culturing anaerobic ammonium oxidizing bacteria, it is important to withdraw the microbe-immobilized materials 14A from the acclimatization-completed vessel 10 in an amount of 25% or less, and to replace the withdrawn materials A by the microbe-immobilized materials 14B substituted therefor over one to two months.

In the operation method of the present invention, it is preferable to acclimatize an excessive amount of the microbe-immobilized materials 14A in the acclimatization-completed vessel 10, provided that the microbe-immobilized materials 14A are to be withdrawn. A 5% excessive amount of the microbe-immobilized materials 14A, a 5% excess of which was to be withdrawn, were introduced into the acclimatization-completed vessel 10 operated at a denitrification rate of 3.0 (kg-N/m$^3$/day) in advance before the withdrawal. A withdrawal and substitution process comprising withdrawing the 5% excess of the microbe-immobilized materials 14A at one time and, at the same time, substituting the new microbe-immobilized materials 14B therefor was performed once a month to carry out continuous operation. As a result, even if the 5% excess of the microbe-immobilized materials 14A was withdrawn from the acclimatization-completed vessel 10, the denitrification rate was not reduced, and quality of treated water from the acclimatization-completed vessel 10 did not deteriorate. Thus, the acclimatization-completed vessel 10 could also be used as a culturing vessel to obtain the acclimatized microbe-immobilized materials 14A once a month, and the materials 14A could be utilized as seed bacteria for the other acclimatization-uncompleted vessel 12.

The amount of the microbe-immobilized materials 14A withdrawn from the acclimatization-completed vessel 10, the frequency of withdrawing the materials 14A from the vessel 10, etc. in order to avoid deterioration of denitrification performance are as described above. Even if the same amount of the microbe-immobilized materials 14A are withdrawn from the acclimatization-completed vessel 10, denitrification performance of the acclimatization-completed vessel 10 is adversely affected if the area in the acclimatization-completed vessel 10 from which the materials 14A are withdrawn is inappropriate. Therefore, the area from which the materials 14A are withdrawn must be appropriately selected.

FIG. 6 shows the results of examining the denitrification rate distribution in the acclimatization-completed vessel 10 in order to select an appropriate area for the withdrawal.

A test of treating inorganic synthetic wastewater was carried out using the vertical acclimatization-completed vessel 10 shown in FIG. 1 in which water to be treated flows upward and the acclimatized microbe-immobilized materials 14A with a nonwoven cloth as an immobilizing material. The microbe-immobilized materials 14A were provided in the acclimatization-completed vessel 10, in which a plurality of round bar-like nonwoven clothes, each with a diameter of 100 mm and a length of 300 mm, were vertically immersed and located. As the water to be treated, inorganic synthetic wastewater having a composition shown in Table 2 was used. The operation was carried out by changing the nitrite nitrogen ($NO_2$—N) concentration and the ammonium nitrogen ($NH_4$—N) concentration. A continuous operation for one month was carried out at a water temperature of 36° C., at an HRT of six hours, and at a nitrogen load of about 1.8 to 2.2 (kg-N/m$^3$/day). The denitrification rate was 1.3 to 1.62 (kg-N/m$^3$/day) in this time.

After one month, one of the microbe-immobilized materials 14A was taken out from the acclimatization-completed vessel 10 and cut into six rectangles with a longitudinal length of 5 cm each. The denitrification rate was examined for each rectangle. The results are shown in Table 6.

The bar graph of FIG. 6 shows the denitrification rates of the respective six rectangles obtained by cutting the nonwoven cloth of the microbe-immobilized material 14A. No. 1 is the lowest rectangle of the nonwoven cloth, cut at a position 50 mm from the lower end of the nonwoven cloth. Similarly, No. 2 is the second lowest rectangle from the lower end, No. 3 is the third lowest rectangle from the lower end, No. 4 is the fourth lowest rectangle from the lower end, No. 5 is the fifth lowest rectangle from the lower end, and No. 6 is the sixth lowest rectangle from the lower end.

As is clear from the results in FIG. 6, the rectangles Nos. 1 to 3 corresponding to the lower half of the microbe-immobilized material 14A had a high denitrification rate, while the rectangles Nos. 4 to 6 corresponding to the upper half of the microbe-immobilized material 14A had a low denitrification rate. This makes it clear that the denitrification rate in the vertical acclimatization-completed vessel 10 is not uniform, and that the denitrification rate is high on the inlet side for water to be treated (lower part of the vessel) and the denitrification rate is low on the outlet side for treated water (upper part of the vessel). In other words, anaerobic ammonium oxidizing bacteria have high activity on the inlet side, and anaerobic ammonium oxidizing bacteria have low activity on the outlet side. Thus, if the microbe-immobilized materials 14A are withdrawn from an area perpendicular to the flow direction of water to be treated flowing in the acclimatization-completed vessel 10, there is a risk of adversely affecting denitrification performance of the acclimatization-completed vessel 10. Specifically, when the area for the withdrawal perpendicular to the flow direction of water to be treated is on the inlet side, a large amount of anaerobic ammonium oxidizing bacteria with high activity are withdrawn, and thus denitrification performance of the acclimatization-completed vessel 10 remarkably deteriorates.

Accordingly, in the operation method of the present invention, when the microbe-immobilized materials 14A are withdrawn from the acclimatization-completed vessel 10, it is important to withdraw the microbe-immobilized materials 14A uniformly from an area parallel to the flow direction of water to be treated flowing in the acclimatization-completed vessel 10 in order not to adversely affect denitrification performance. A plurality of the fixed bed-type microbe-immobilized materials 14A in which cylindrical containers were packed with PVA gel beads were vertically immersed and located in the acclimatization-completed vessel 10, instead of the microbe-immobilized materials 14A using a nonwoven cloth as an immobilizing material, to carry out a withdrawal test in the same manner. Also in this case, when the microbe-immobilized material 14A were withdrawn uniformly from an area parallel to the flow direction of water to be treated flowing in the acclimatization-completed vessel 10, denitrification performance of the acclimatization-completed vessel 10 was almost not adversely affected. It is important to appropriately select the area from which the microbe-immobilized materials 14A are withdrawn, not only in the case where the materials 14A are microbe-immobilized materials with a fixed bed such as a nonwoven cloth or PVA gel beads with which a cylindrical container is packed.

In order to determine the relation between the area from which the microbe-immobilized materials 14A are withdrawn and denitrification performance, as shown in the conceptual view of FIG. 7, the acclimatization-completed vessel 10 was configured so that the acclimatized microbe-immobilized materials 14A could be withdrawn from both an area parallel to the flow direction of water to be treated and an area perpendicular to the flow direction of water to be treated. Specifically, in the acclimatization-completed vessel 10, ten microbe-immobilized materials 14A were vertically located, each of the microbe-immobilized materials 14A was cut into ten rectangles, and each of the rectangles was supported by a supporting member (not shown). Two sets of such vessels 10 were prepared. In an actual acclimatization-completed vessel 10, the microbe-immobilized materials 14A are located also at the front and the back of FIG. 7. Here, the microbe-immobilized materials 14A located on one flat plane shown in the figure will be described for ease of understanding. Thus, when an assembly of ten rectangles 13 surrounded by the dotted line of FIG. 7, specifically, the microbe-immobilized material 14A before being cut into the rectangles 13, is withdrawn, the microbe-immobilized material 14A is withdrawn from an area parallel to the flow direction of water to be treated. When an assembly 15 of ten rectangles 13 surrounded by the two-dot chain line is withdrawn, the microbe-immobilized material 14A is withdrawn from an area perpendicular to the flow direction of water to be treated. The amount of the withdrawn material 14A is the same in both cases. The two acclimatization-completed vessels 10 were continuously operated using inorganic synthetic wastewater shown in Table 2 at a nitrogen load of about 1.8 to 2.2 (kg-N/m$^3$/day). The denitrification rate was 1.3 to 1.62 (kg-N/m$^3$/day) in this time. It was confirmed that the nitrite nitrogen concentration in the treated water discharged from the acclimatization-completed vessels 10 reached 5 mg/L and thus denitrification performance was made stable. Then, one nonwoven cloth was withdrawn from the one acclimatization-completed vessel 10, while the assembly 15 of ten rectangles perpendicular to the flow direction was withdrawn from the other acclimatization-completed vessel 10. The assembly 15 of ten rectangles was withdrawn on the inlet side at a position 50 to 75 mm from the lower end of the nonwoven cloth.

As a result, when one nonwoven cloth was withdrawn from an area parallel to the flow direction of water to be treated, the nitrite nitrogen concentration in the treated water rose to 30 mg/L briefly. However, when about 10 days passed, the nitrite nitrogen concentration in the treated water fell to the original 5 mg/L. On the contrary, when the assembly 15 of ten rectangles was withdrawn from an area perpendicular to the flow direction of water to be treated, the denitrification rate in the acclimatization-completed vessel 10 was reduced, the nitrite nitrogen concentration in the treated water was above 100 mg/L, and the denitrification rate was not recovered to the original rate even when 30 days passed. Anaerobic ammonium oxidizing bacteria in the acclimatization-completed vessel 10 were examined to find that the bacteria were inactivated.

By withdrawing the microbe-immobilized materials 14A uniformly from an area parallel to the flow direction of water to be treated flowing in the acclimatization-completed vessel 10, the microbe-immobilized materials 14A can be withdrawn without adversely affecting denitrification performance of the acclimatization-completed vessel 10.

Figure 8A:
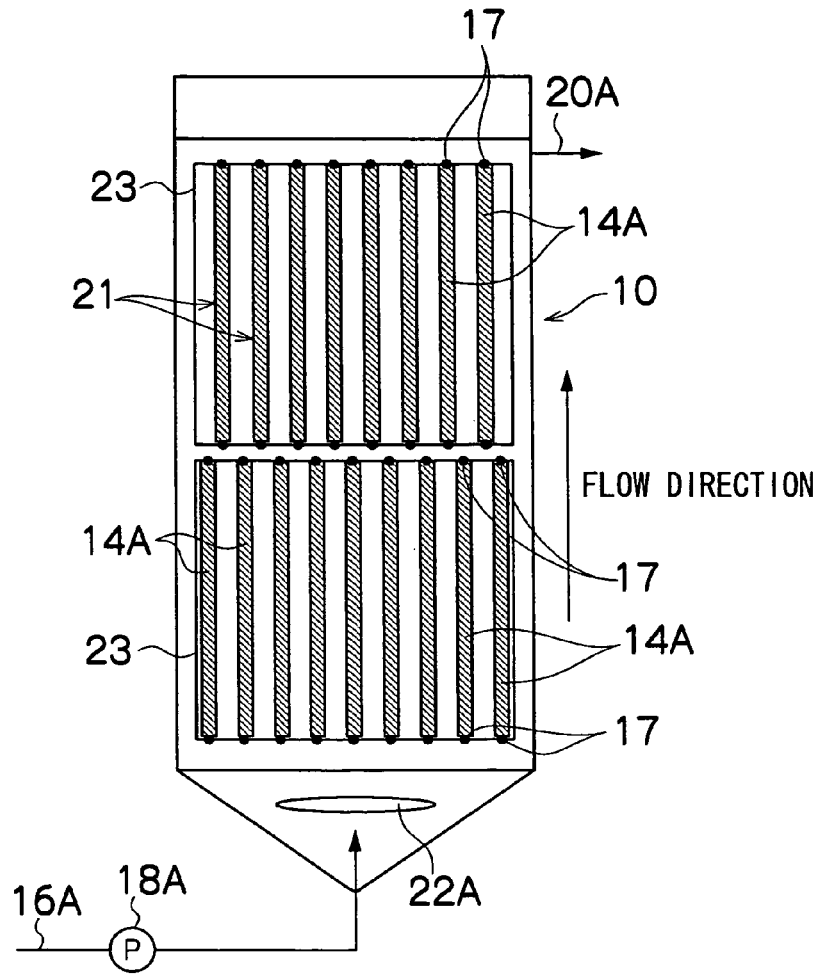
FIGS. 8A and 8B are views for describing a configuration of a vertical acclimatization-completed vessel equipped with units obtained by unitizing microbe-immobilized materials parallel to the flow direction of water to be treated in the anaerobic ammonium oxidation equipment of the present invention.
Figure 8B:
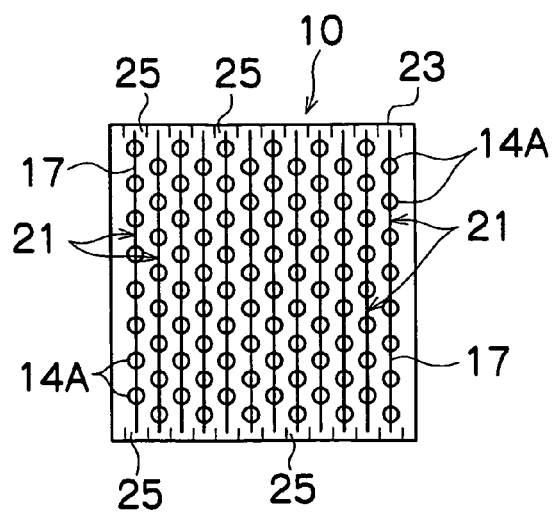

FIGS. 8A and 8B show nonwoven clothes as immobilization materials unitized so that the microbe-immobilized materials 14A can be withdrawn uniformly in a simple manner from an area parallel to the flow direction of water to be treated flowing in the vertical acclimatization-completed vessel 10. FIG. 8A is a conceptual side view, and FIG. 8B is a conceptual top view.

As shown in FIGS. 8A and 8B, in water to be treated in the vertical acclimatization-completed vessel 10, many microbe-immobilized materials 14A using a bar-like nonwoven cloth as an immobilizing material are vertically located in upper and lower rows, and the microbe-immobilized materials 14A are arranged with a predetermined gap (interval) between the adjacent two. The microbe-immobilized materials 14A of the upper row are located above the gaps of the lower row, and the microbe-immobilized materials 14A of the lower row are located below the gaps of the upper row. The upper ends and the lower ends of the nonwoven clothes are connected by a connection bar 17, respectively, in the microbe-immobilized materials 14A in the same row. Thus, as shown in FIG. 8B, square plate-like units 21, in which a plurality of the microbe-immobilized materials 14A with an interval between the adjacent two are supported by a pair of the upper and lower connection bars 17, are formed. In each of the upper and lower rows of the acclimatization-completed vessel, the plurality of units 21 are supported by a casing 23 with a framework open in four directions. In the casing 23, guide grooves 25 into which the units 21 are to be inserted are vertically formed at predetermined intervals. By inserting the units 21 into the guide grooves 25, the plurality of units 21 can be arranged parallel to the flow direction of water to be treated.

When the microbe-immobilized materials 14A are fixed bed-type materials and are immersed in the acclimatization-completed vessel 10 as the plurality of units 21 parallel to the flow direction of water to be treated in this manner, the microbe-immobilized materials 14A can be uniformly and easily withdrawn from an area parallel to the flow direction of water to be treated by withdrawing the units 21. Since the microbe-immobilized materials 14A in the upper row and the materials 14A in the lower row are alternately located in the acclimatization-completed vessel 10, and a baffle 22A is located at the inlet for water to be treated, the flow of water to be treated can be dispersed inside the whole acclimatization-completed vessel 10. Thus, there is no local region with a high nitrite nitrogen concentration in the acclimatization-completed vessel 10. This is because, although anaerobic ammonium oxidation in which ammonium and nitrite are simultaneously denitrified requires nitrite, it is not preferable if there is a local region with a high nitrite nitrogen concentration in the acclimatization-completed vessel 10, since a nitrite nitrogen concentration of 80 mg/L or more inhibits activity of anaerobic ammonium oxidizing bacteria.

Figure 9A:
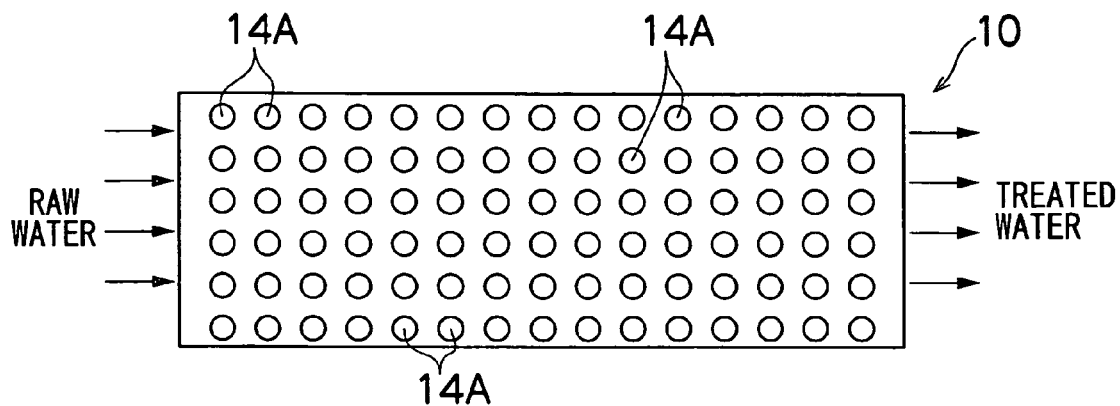
FIGS. 9A to 9C are views for describing a configuration of a horizontal acclimatization-completed vessel equipped with units obtained by unitizing microbe-immobilized materials parallel to the flow direction of water to be treated in the anaerobic ammonium oxidation equipment of the present invention.
Figure 9B:
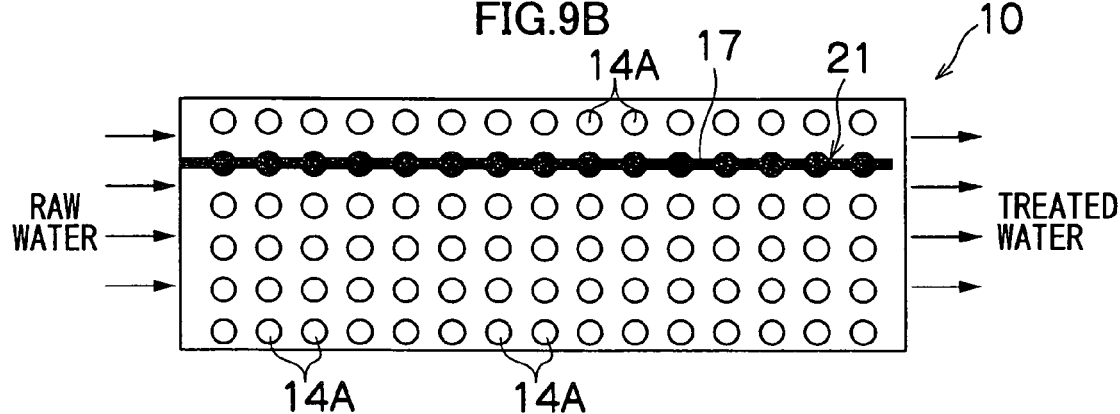
Figure 9C:
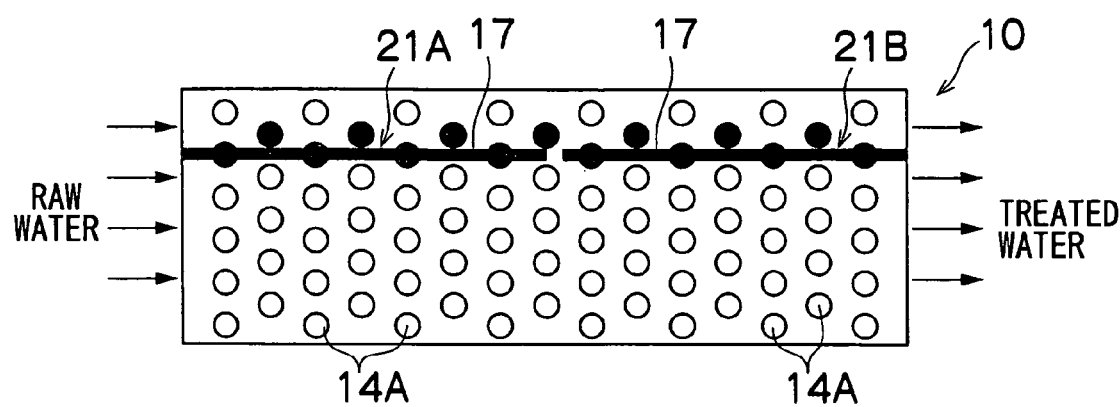

FIGS. 8A and 8B show an example of the vertical acclimatization-completed vessel 10, while FIGS. 9A to 9C show a case of the horizontal acclimatization-completed vessel 10. The same member or device as in FIGS. 8A and 8B will be described with the same reference numeral, and the description is omitted.

In the horizontal acclimatization-completed vessel 10, as shown in FIG. 9A, water to be treated (raw water) flows horizontally from the inlet part of the acclimatization-completed vessel 10 (left side of FIGS. 9A to 9C) toward the outlet part of the vessel 10 (right side of FIGS. 9A to 9C). Accordingly, as shown in FIG. 9B, only one row of the microbe-immobilized materials parallel to the flow direction of water to be treated (nonwoven clothes indicated by black) among a large number of the acclimatized microbe-immobilized materials 14A arranged at intervals in the acclimatization-completed vessel 10 are connected by the connection bar 17 as in FIG. 8 to form the unit 21, and the unit 21 is withdrawn. Since one unit 21 to be withdrawn is formed in this manner, it is not necessary to form all microbe-immobilized materials 14A as the units 21, and thus the materials 14A can be unitized easily and the unit 21 can be prepared at a low cost. It is also possible to divide the unit 21 provided in one row as in FIG. 9C into two units 21A and 21B on the inlet and outlet sides, and to select the unit to be withdrawn from the units 21A and 21B depending on denitrification performance of the acclimatization-completed vessel 10. In the horizontal acclimatization-completed vessel 10, however, it is possible to unitize all microbe-immobilized materials 14A as in the vertical acclimatization-completed vessel 10 of FIGS. 8A and 8B.

What is claimed is:

1. A method for operating an anaerobic ammonium oxidation vessel in anaerobic ammonium oxidation in which ammonium and nitrite in water to be treated are simultaneously denitrified by anaerobic ammonium oxidizing bacteria, the method comprising the steps of:

withdrawing a part of the anaerobic ammonium oxidizing bacteria from one anaerobic ammonium oxidation vessel in which the anaerobic ammonium oxidizing bacteria have been acclimatized, wherein the withdrawn anaerobic ammonium oxidizing bacteria includes at least a part of an excess amount of unaerobic ammonium oxidizing bacteria acclimatized in the one anaerobic ammonium oxidation vessel and wherein the one anaerobic ammonium oxidation vessel retains an amount of the anaerobic ammonium oxidizing bacteria following the withdrawing such that denitrification performance of the one anaerobic ammonium oxidation vessel is not affected, and introducing the withdrawn anaerobic ammonium oxidizing bacteria into another anaerobic ammonium oxidation vessel in which acclimatization is to be carried out to perform start-up operation, wherein the anaerobic ammonium oxidizing bacteria having been acclimatized in the one anaerobic ammonium oxidation vessel are provided as microbe-immobilized materials in which the bacteria are attached to and immobilized on immobilizing materials or entrapped and immobilized in immobilizing materials.

2. The method for operating an anaerobic ammonium oxidation vessel according to claim 1, further comprising: acclimatizing an amount of the microbe-immobilized materials in the one anaerobic ammonium oxidation vessel, provided that the microbe-immobilized materials are to be withdrawn.

3. The method for operating an anaerobic ammonium oxidation vessel according to claim 2, further comprising: withdrawing the acclimatized microbe-immobilized materials from the one anaerobic ammonium oxidation vessel, and substituting new unacclimatized microbe-immobilized materials therefor.

4. Anaerobic ammonium oxidation equipment which is configured to carry out the method for operating an anaerobic ammonium oxidation vessel of claim 3.

5. Anaerobic ammonium oxidation equipment which is configured to carry out the method for operating an anaerobic ammonium oxidation vessel of claim 2.

6. The method for operating an anaerobic ammonium oxidation vessel according to claim 1, further comprising: withdrawing the acclimatized microbe-immobilized materials from the one anaerobic ammonium oxidation vessel, and substituting new unacclimatized microbe-immobilized materials therefor.

7. Anaerobic ammonium oxidation equipment which is configured to carry out the method for operating an anaerobic ammonium oxidation vessel of claim 6.

8. The method for operating an anaerobic ammonium oxidation vessel according to claim 1, wherein the microbe-immobilized materials are withdrawn from the one anaerobic ammonium oxidation vessel in a plurality of times so that the total acclimatized microbe-immobilized materials are replaced by unacclimatized microbe-immobilized materials over one month or more.

9. Anaerobic ammonium oxidation equipment which is configured to carry out the method for operating an anaerobic ammonium oxidation vessel of claim 8.

10. The method for operating an anaerobic ammonium oxidation vessel according to claim 1, further comprising: preparing the microbe-immobilized materials by attaching microbes to fixed beds and arranging the fixed beds as a plurality of units in the one anaerobic ammonium oxidation vessel, and wherein the withdrawing comprises withdrawing only a plurality of the units that are parallel with respect to the flow direction of water to be treated.

11. Anaerobic ammonium oxidation equipment which is configured to carry out the method for operating an anaerobic ammonium oxidation vessel of claim 10.

12. Anaerobic ammonium oxidation equipment which is configured to carry out the method for operating an anaerobic ammonium oxidation vessel of claim 1.

13. A method for operating an anaerobic ammonium oxidation vessel in anaerobic ammonium oxidation in which ammonium and nitrite in water to be treated are simultaneously denitrified by anaerobic ammonium oxidizing bacteria, the method comprising the steps of:

withdrawing a part of the anaerobic ammonium oxidizing bacteria from one anaerobic ammonium oxidation vessel in which the anaerobic ammonium oxidizing bacteria have been acclimatized, and introducing the withdrawn anaerobic ammonium oxidizing bacteria into another anaerobic ammonium oxidation vessel in which acclimatization is to be carried out to perform start-up operation, wherein the anaerobic ammonium oxidizing bacteria having been acclimatized in the one anaerobic ammonium oxidation vessel are provided as microbe-immobilized materials in which the bacteria are attached to and immobilized on immobilizing materials or entrapped and immobilized in immobilizing materials, wherein the microbe-immobilized materials are withdrawn at one time from the one anaerobic ammonium oxidation vessel in an amount of 25% or less of the total acclimatized microbe-immobilized materials.

14. The method for operating an anaerobic ammonium oxidation vessel according to claim 13, further comprising: acclimatizing an amount of the microbe-immobilized materials in the one anaerobic ammonium oxidation vessel, provided that the microbe-immobilized materials are to be withdrawn.

15. The method for operating an anaerobic ammonium oxidation vessel according to claim 14, further comprising: withdrawing the acclimatized microbe-immobilized materials from the one anaerobic ammonium oxidation vessel, and substituting new unacclimatized microbe-immobilized materials therefor.

16. Anaerobic ammonium oxidation equipment which is configured to carry out the method for operating an anaerobic ammonium oxidation vessel of claim 15.

17. Anaerobic ammonium oxidation equipment which is configured to carry out the method for operating an anaerobic ammonium oxidation vessel of claim 14.

18. The method for operating an anaerobic ammonium oxidation vessel according to claim 13, further comprising: withdrawing the acclimatized microbe-immobilized materials from the one anaerobic ammonium oxidation vessel, and substituting new unacclimatized microbe-immobilized materials therefor.

19. Anaerobic ammonium oxidation equipment which is configured to carry out the method for operating an anaerobic ammonium oxidation vessel of claim 18.

20. Anaerobic ammonium oxidation equipment which is configured to carry out the method for operating an anaerobic ammonium oxidation vessel of claim 13.

21. Anaerobic ammonium oxidation equipment in which ammonium and nitrite in water to be treated are simultaneously denitrified by anaerobic ammonium oxidizing bacteria, the equipment comprising:

an acclimatization-completed vessel in which the anaerobic ammonium oxidizing bacteria have been acclimatized and including an excess amount of anaerobic ammonium oxidizing bacteria than required for denitrification in the acclimatization-completed vessel;

an acclimatization-uncompleted vessel in which the anaerobic ammonium oxidizing bacteria are to be acclimatized;

a plurality of individual units which are provided in at least the acclimatization-completed vessel selected from the acclimatization-completed vessel and the acclimatization-uncompleted vessel and in which fixed beds, on which microbes containing the anaerobic ammonium oxidizing bacteria are immobilized, are arranged parallel to the flow direction of the water to be treated; and a casing which detachably supports the plurality of units, wherein the plurality of units is arranged in the casing such that each of the individual units of the plurality of units is removable from the casing, wherein, when the acclimatization-uncompleted vessel is started up with the anaerobic ammonium oxidizing bacteria in the acclimatization-completed vessel as seed bacteria, one or more of the individual units is withdrawn from the acclimatization-completed vessel and placed in the acclimatization-uncompleted vessel, wherein microbe-immobilized materials are withdrawn at one time from the acclimatization-completed vessel in an amount of 25% or less of a total of the microbes that are immobilized, wherein the amount of 25% or less of the total of the microbes that are immobilized are contained within the withdrawn ones of the individual unit(s), wherein the withdrawn amount of the microbe-immobilized materials includes at least a part of the excess amount of the anaerobic ammonium oxidizing bacteria in the acclimatization-completed vessel, and wherein following the withdrawal, the acclimatization-completed vessel retains sufficient anaerobic ammonium oxidizing bacteria such that denitrification performance of the acclimatization-completed vessel is not affected.

22. The anaerobic ammonium oxidation equipment in which ammonium and nitrite in water to be treated are simultaneously denitrified by anaerobic ammonium oxidizing bacteria according to claim 21, wherein the individual units comprise separate individual units.

23. The anaerobic ammonium oxidation equipment in which ammonium and nitrite in water to be treated are simultaneously denitrified by anaerobic ammonium oxidizing bacteria according to claim 21, wherein the individual units comprise connected units.

* * * * *